(12) United States Patent
Lim

(10) Patent No.: US 7,650,472 B2
(45) Date of Patent: Jan. 19, 2010

(54) METHOD FOR REDUCING MEMORY POWER CONSUMPTION

(75) Inventor: Donghyouk Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 353 days.

(21) Appl. No.: 11/331,510

(22) Filed: Jan. 13, 2006

(65) Prior Publication Data

US 2007/0016807 A1 Jan. 18, 2007

(30) Foreign Application Priority Data

Jul. 12, 2005 (KR) .................. 10-2005-0062701
Oct. 12, 2005 (KR) .................. 10-2005-0096236

(51) Int. Cl.
*G06F 12/00* (2006.01)
*G06F 13/00* (2006.01)
*G06F 13/28* (2006.01)

(52) U.S. Cl. ..................................... 711/154
(58) Field of Classification Search .................. 711/154
See application file for complete search history.

(56) References Cited

U.S. PATENT DOCUMENTS

| 5,361,337 | A | * | 11/1994 | Okin | 712/228 |
| 6,006,320 | A | * | 12/1999 | Parady | 712/36 |
| 6,434,708 | B1 | * | 8/2002 | Dunnihoo et al. | 713/502 |
| 2003/0172256 | A1 | * | 9/2003 | Soltis et al. | 712/228 |
| 2004/0151042 | A1 | * | 8/2004 | Woo et al. | 365/200 |
| 2005/0125702 | A1 | * | 6/2005 | Huang et al. | 713/320 |

OTHER PUBLICATIONS

Alvin R. Lebeck, et al; "Power Aware Page Allocation", ASPLOS 2000, Cambridge, MA, Nov. 12-15-2000; pp. 105-116.*
Donghyouk Lim, "Software Techniques for Reducing Memory Power Consumption," Department of Electrical Engineering & Computer Science, Division of Computer Science, Korea Advanced Institute of Science and Technology, Disclosed Jan. 12, 2005.
Hai Huang et al, "Design and Implementation of Power-Aware Virtual Memory," Real-Time Computing Laboratory, Department of Electrical Engineering and Computer Science, The University of Michigan.
V. Delaluz et al, "Scheduler-Based DRAM Energy Management," The Pennsylvania State University, DAC 2002, Jun. 10-14, 2002, New Orleans, LA.
Alvin R. Lebeck, et al; "Power Aware Page Allocation", ASPLOS 2000, Cambridge, MA, Nov. 12-15 2000; pp. 105-116.

* cited by examiner

*Primary Examiner*—Matt Kim
*Assistant Examiner*—Ralph A Verderamo, III
(74) *Attorney, Agent, or Firm*—Ladas & Parry LLP

(57) ABSTRACT

Provided is a method for reducing memory power consumption. A period of time allocated to a process is split into time slices each have a predetermined time interval, and a timer interrupt is generated for every time slice. It is checked whether context switch between processes occurs when the timer interrupt is generated. Memory banks having a memory allocated to a switched process are activated when the context switch occurs. All banks of a memory are converted into a low power state when the context switch does not occur. Accordingly, memory power consumption can be reduced through a software technique.

9 Claims, 4 Drawing Sheets

METHOD FOR REDUCING MEMORY POWER CONSUMPTION

CROSS-REFERENCE TO RELATED PATENT APPLICATION

This application claims the benefit of Korean Patent Application No. 10-2005-0062701, filed on Jul. 12, 2005, and Korean Patent Application No. 10-2005-0096236, filed on Oct. 12, 2005, in the Korean Intellectual Property Office, the disclosure of which is incorporated herein in its entirety by reference.

BACKGROUND OF THE INVENTION

1. Field of the Invention

The present invention relates to a method of managing memory power, and more particularly, to a method for reducing memory power consumption using a software technique.

2. Description of the Related Art

With the development of semiconductor process techniques, lots of technical limitations on manufacturing embedded systems have been mitigated. Improvement of definition due to the development of process techniques enables production of chips having performance higher than conventional one even though they have small sizes. However, the growing embedded systems have a problem that they are used only for a short period of time. Definition improvement increases consumption power though it enhances integration of semiconductor devices. To increase the performance of a processor, that is, a processing speed, the rate of a clock signal provided to the processor should be raised. The clock rate is increased in proportion to the level of a voltage provided, and thus power used in the processor is proportional to the square of the voltage supplied to the processor. Accordingly, battery capacity of a built-in system has reached the level that is difficult to endure consumption power of the system, and a short use time of the system aggravates inconvenience of users.

A memory used in a computer is a volatile storing device generally composed of a RAM (Random Access Memory). The RAM is classified into a static RAM (SRAM) and a dynamic RAM (DRAM). The DRAM is mainly used for a main memory requiring large capacity because it has a simple structure and needs small power consumption and low cost. The SRAM is used for a cache memory because it has small storage capacity for its cost while having a high access speed.

Recently, a double data rate DRAM (DDR-DRAM) and Rambus DRAM (RDRAM) developed from the DRAM have been proposed. The RDRAM has a memory address allocation method largely different from conventional systems because of its transfer rate and improvement of buses used. Specifically, in the RDRAM, a memory bus size is identical to the bandwidth of each chip but memory address allocation is continuously made in one chip to reduce the number of activated chips. Because of this, the RDRAM is adopted for most systems in conventional studies.

Conventional techniques for reducing memory power consumption are focused on exclusively setting a memory region for an operating process. A computer main memory system consists of banks, and the operating state of a memory chip can be controlled bank by bank.

FIG. 1 illustrates state transition diagram of a conventional RDAM. In FIG. 1, the magnitude of power consumed in each state of the RDRAM and a period of time required for state change are shown. An RDRAM module can have four states and different modules can have different states. There is no data loss in any state. A state change in the module is made through a memory controller device, and state transition can be accomplished by operating a specific register of the controller through a PCI bus.

A memory waits in a stand-by state. When the memory receives a request for a read/write operation, the state of the memory is changed to an attention state to carry out the operation corresponding to the received request. After a predetermined lapse of time, the attention state is changed to the stand-by state. That is, only the stand-by and attention states are used in the conventional technique. However, because the memory state can be changed to a nap state or a power-down state requiring lower consumption power for devices which are not substantially used, power consumption can be reduced by using this low power state.

FIG. 2 illustrates an example of memory allocation of a PADRAM (Power Aware Page Allocation DRAM). The method shown in FIG. 2 proposes a continuous memory allocation technique, which continuously allocates memories until all the memories of selected banks are allocated instead of random selection of memory banks. That is, memory banks started to be used are continuously allocated irrespective of a process. Using this method, the number of memory banks used by the process can be reduced and other banks can be converted into a low power state while the process is executed to result in a decrease in power consumption. Furthermore, the aforementioned method proposes additional hardware capable of converting a memory power state and changes the power state to reduce power consumption. However, this method has a shortcoming that many processes share one bank because it is focused on minimization of use of banks without regard to a multi-process environment.

There is another conventional method using a scheduler of an operating system. This method allocates banks randomly. Specifically, a memory bank currently actively used becomes a memory bank used by a currently operating process. The operating system changes a memory state at the moment of time of context switch between processes, which occurs when the process is executed, with the memory bank to activate a memory bank required for the future executions of processes and covert other banks into a low power state to reduce a large amount of power.

FIG. 3 illustrates an example of memory allocation of a PAVM (Power Aware Virtual Memory). Referring to FIG. 3, memory banks used by processes are arranged exclusively only using a software technique and states of the memory banks are changed through a scheduler. The memory banks are classified into a shared memory bank and a general memory bank. A shared memory is allocated to the shared memory bank and a general memory is allocated based on bank information that each process has. And, general memory banks are arranged such that they are not overlapped for each process to separate an instantaneously used region of a memory from the memory.

SUMMARY OF THE INVENTION

The present invention provides a method that divides an execution time allocated to a process into a plurality of time intervals and determines whether a memory state is changed to a low power state for every time interval to reduce memory power consumption.

The present invention also provides a computer readable recording medium storing a program for executing a method for reducing memory power consumption in a computer.

According to an aspect of the present invention, there is provided a method of managing memory power comprising:

(a) splitting a period of time allocated to a process into time slices each have a predetermined time interval and generating a timer interrupt for every time slice; (b) checking whether context switch between processes occurs when the timer interrupt is generated; (c) activating memory banks having a memory allocated to a switched process when the context switch occurs; and (d) converting all banks of a memory into a low power state when the context switch does not occur.

According to another aspect of the present invention, there is provided a method of managing memory power using lazy context switch scheduling comprising: (a) splitting a period of time allocated to a process into time slices each have a predetermined time interval and generating a timer interrupt for every time slice; (b) converting all banks of a memory into a low power state when the timer interrupt is generated and checking whether a cache miss is generated during the time slices; and (c) increasing the number of time slices allocated to the process when the cache miss is not generated Accordingly, memory power consumption can be reduced using a software technique.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
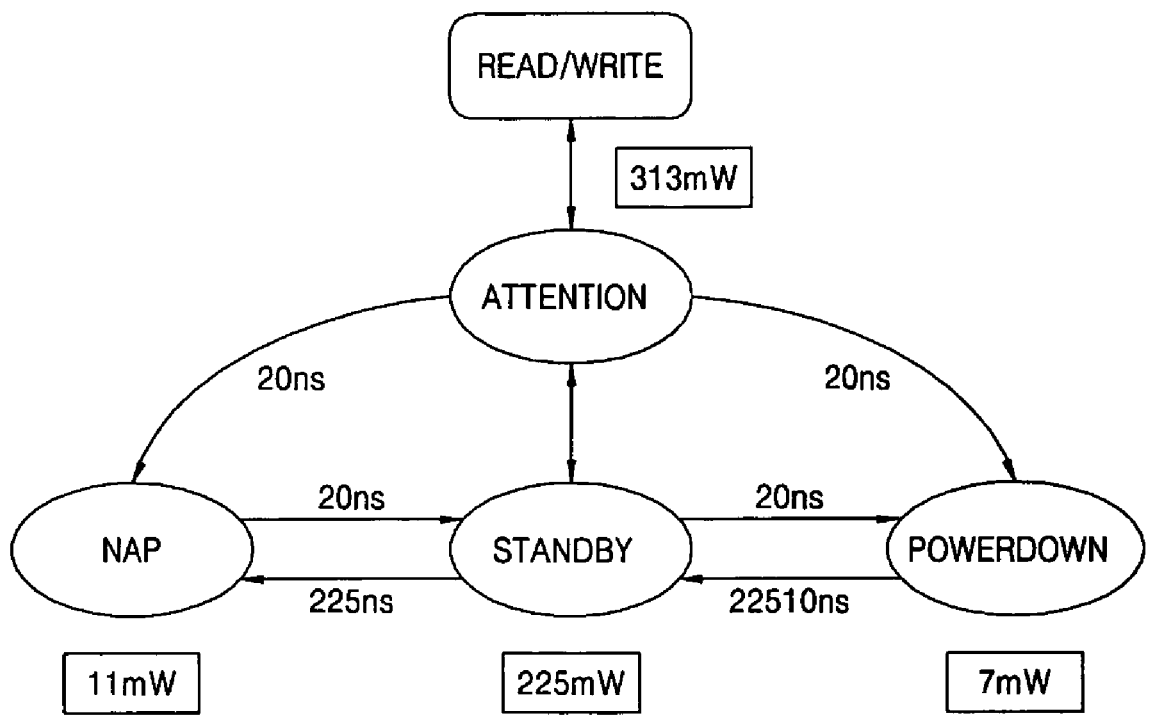
FIG. 1 illustrates state transition diagram of a conventional RDRAM.
Figure 2:
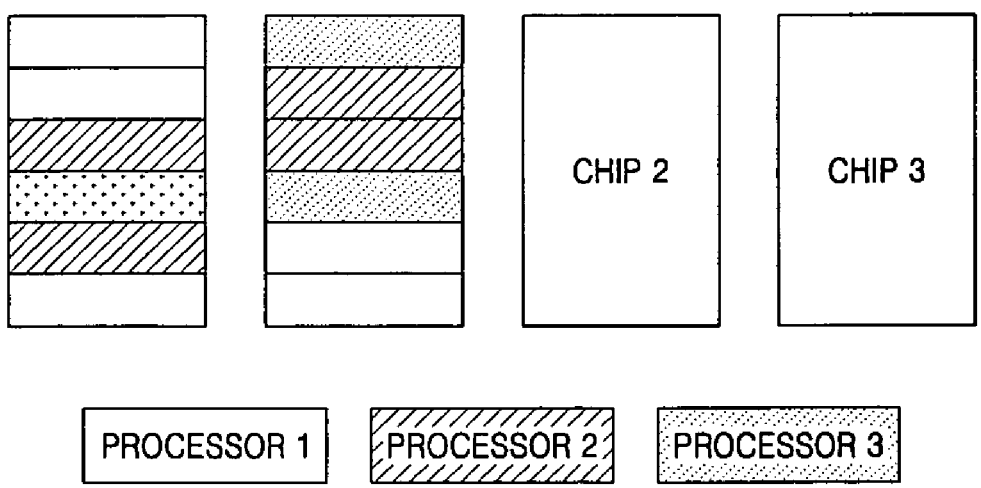
FIG. 2 illustrates an example of memory allocation of a PADRAM (Power Aware Allocation DRAM)
Figure 3:
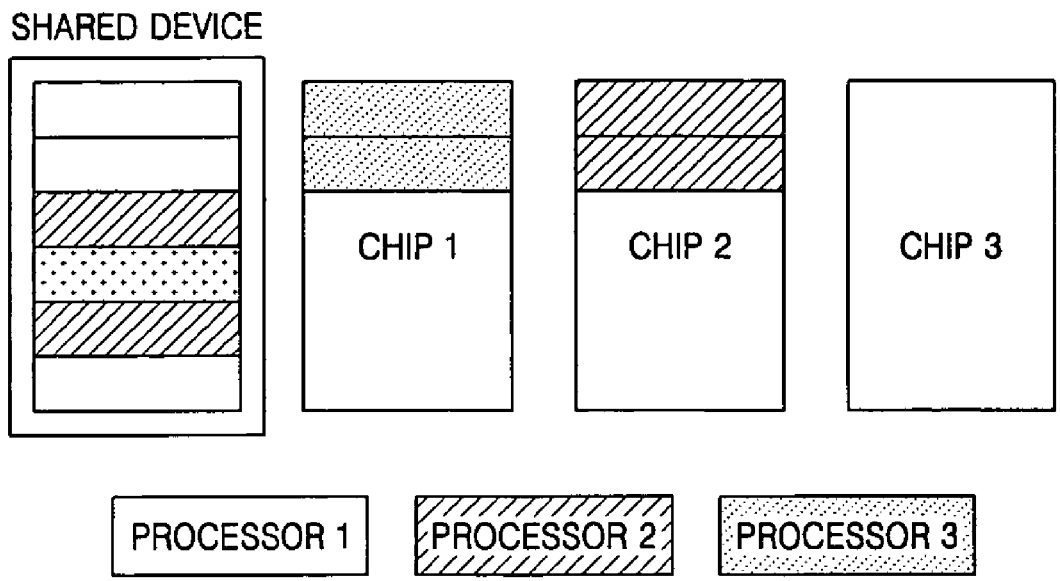
FIG. 3 illustrates an example of memory allocation of a PAVM (Power Aware Virtual Memory)

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

Figure 4:
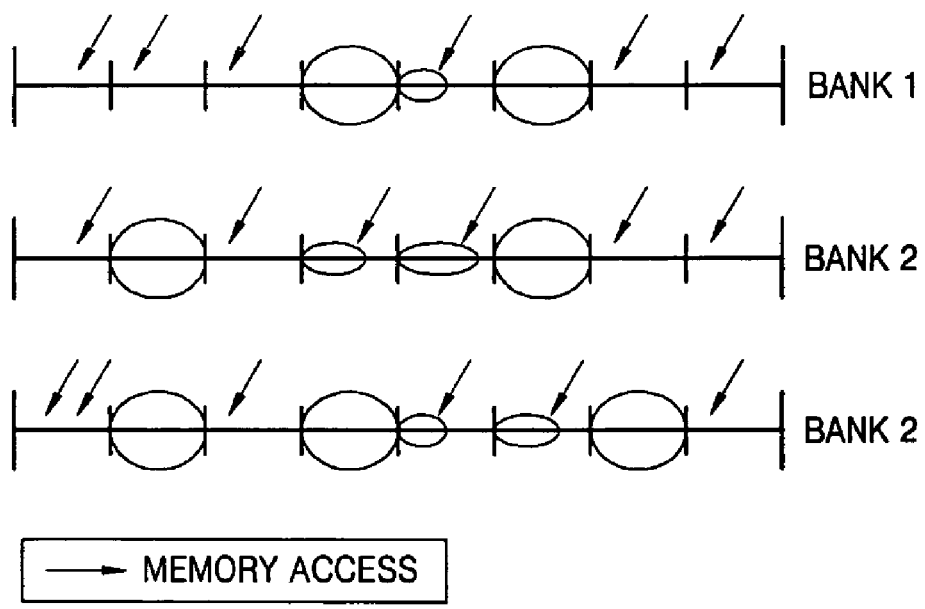
FIG. 4 illustrates a memory access pattern.

FIG. 4 illustrates a memory access pattern. In FIG. 4, the horizontal axis represents the lapse of time, and one scale represents a timer interrupt interval (referred to as 'tick' hereinafter). In addition, a portion indicated by an ellipse is an idle period of a memory. A memory device actually has an idle period, and memory reference frequently occurs in the latter part of a tick. Furthermore, this occurs more frequently in a general system having a cache. A memory is actually used when a region that does not exist in a cache is accessed. In consideration of locality of a program, most of memory reference can be solved with reference to a cache. The quantity of memory used when a process is operating is smaller than the size of a region actually allocated to the process, and there is no need to activate the entire memory region of the process all the time.

Figure 5:
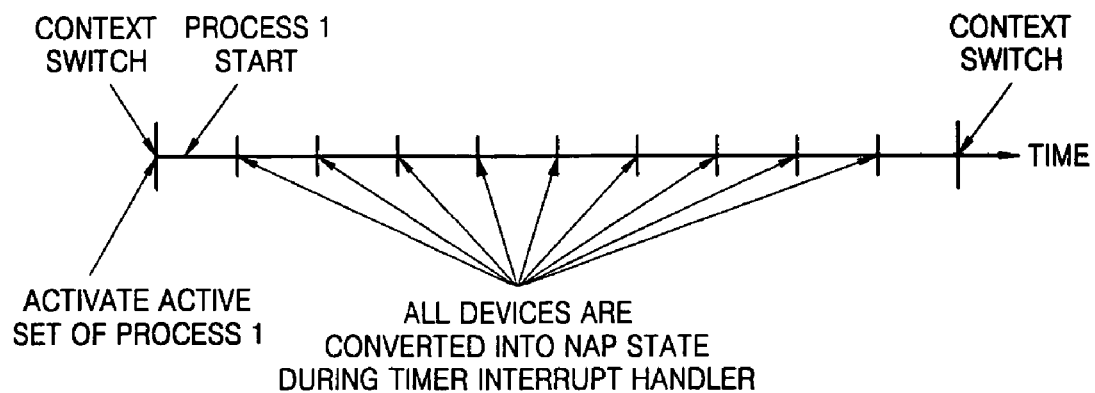
FIG. 5 illustrates a software-napping method according to an embodiment of the present invention.

FIG. 5 illustrates a software-napping method according to an embodiment of the present invention. In FIG. 5, the horizontal axis represents the lapse of time and one scale represents a timer interrupt interval (one tick). A timer interrupt handler is operated for every timer interrupt interval. The software-napping according to the present invention converts Active Set of a process newly scheduled at the point of time of context switch to Standby. However, after the lapse of one tick, the software-napping converts all devices of a memory into a nap state all the time for every timer interrupt. By doing so, power consumption of an idle device during one tick can be reduced and, additionally, power of a device used in the latter or middle part of a tick can be saved. The reason of this state conversion policy is as follows.

First, state change overhead of a device is relatively small. The state change overhead is not large compared to power consumption of standby and nap states. Break-even time obtained from calculation is approximately 250 ns. There are a small number of devices referring to a device within 250 ns from the moment when a new tick is started, and most of devices are not referred to. During this time, power of the devices that are not referred to is saved, showing better result.

Second, an interval of determining memory state conversion in access using hardware is set to 500 μs corresponding to half a timer interrupt interval of Linux Kernel, 1 ms. The interval can be controlled In the case of access using hardware. However, overhead according to minute control is increased as the interval is decreased. The timer interrupt has minuteness half the minuteness of hardware as the internal in hardware access is set to 500 μs in consideration of overhead. However, state change is carried out with the half minuteness only for memory devices actually used by a process, and the two methods respectively using software and hardware have the same power reduction effect for devices not used. In consideration of this, the method using software can considerably reduce power consumption.

The software-napping simultaneously operates all devices, and thus it is very difficult and complicated for an operating system to find out the current working set of a process compared to the hardware method. In the case of the method using hardware, the hardware knows all addresses with respect to all memories. The hardware internally has a memory device such as a register to estimate memory access possibility through information and minutely operate devices through the memory access possibility. However, the operating system is difficult to collect dynamic data. The operating system knows the use of a memory only for a specific event such as page fault. Thus, the quantity of information is too small to estimate actually used memory devices and only restricted information is obtained. This may bring about a contrary effect. The software-napping adopts a method of converting all devices into the nap state to reduce overhead caused by erroneous state conversion and decrease power consumption of devices not used.

A process scheduling method in consideration of memory reference according to the present invention will now be explained.

Substantial memory reference is a cause for increasing consumption power of a memory. In the case of a system having a memory layer including a cache memory, the use of cache largely affects the power of the memory. Memory reference is caused by cache miss, and the frequency of referencing to the memory is reduced as the hit ratio of the cache is increased to decrease power consumption of the memory.

Cache misses occurring while processes are executed are caused by various reasons. Among them, a cold cache miss caused by context switch occurs frequently. A process that consumes the entire time allocated thereto is switched to a new process. The memory is filled with data of the new process.

In the case of a process in which a small cache miss occurs because of using many memories, a cache miss caused by process execution is larger than the cold cache miss due to context switch. In the case of general processes, however, the cold cache miss caused by context switch is dominant. A period of time allocated to one process in one period is average 10 ms. When the quantity of use of a memory during this time is considered, the cold cache miss caused by context switch cannot be ignored in the general processes.

Most of programs read required data in an earlier part of a time slice allocated thereto, use the data, and read new data again. Many systems have this pattern according to the principle of locality. Assume that there is context switch in the middle of this process. There is high possibility that data used by the existing process and loaded in a cache is replaced with data used by a process substituted due to context switch. Particularly, a cache memory is smaller in size than a general memory so that the possibility is much higher. Accordingly, context switch destroys locality of data to result in an increase in the number of memory reference and large influence on power consumption.

In this case, there are two attempts to make. The first one is to put off memory reference after context switch through early context switch before data loading because there is possibility of reading data, read at the point of time closest to context switch time, to a cache after context switch. The second one is to put off the context switch time to utilize corresponding data and then perform context switch.

Figure 6:
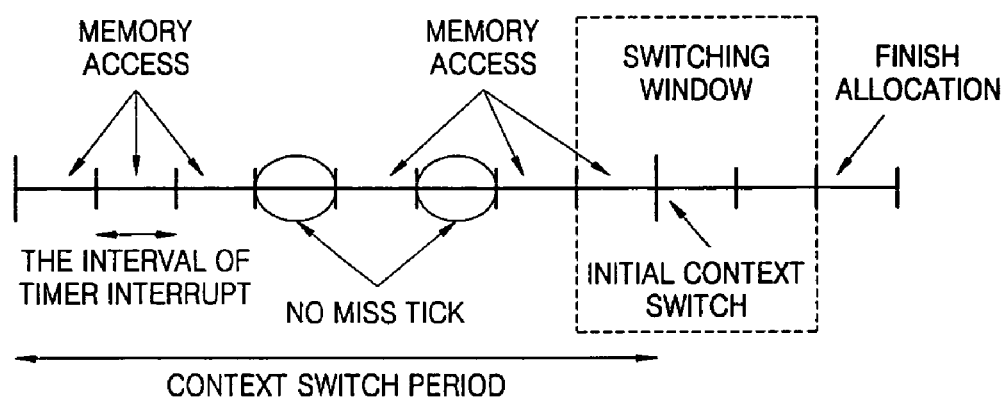
FIG. 6 illustrates early context switch scheduling (ESS) according to the present invention.

FIG. 6 illustrates early context switch scheduling (ESS) according to the present invention. There is high possibility that data read by a process with reference to a memory at the point of time close to the context switch time is replaced with new data of a new process when other processes use a CPU after context switch. Considering this, cold miss caused by context switch and data reference are overlapped such that a memory reference pattern corresponds to a context switch period.

FIG. 6 illustrates a situation occurring when a new process is executed due to context switch. A handler checks a cache miss during one tick for every timer interrupt. If there is a tick having no cache miss, the currently executed process is considered to have locality. In this case, data is read first and then a pattern used can be repeated.

However, if a cache miss occurs in a window having an appropriate size, as shown in FIG. 6, data read at this time may be replaced while another process reads data after context switch. Thus, context switch is advanced.

When context switch and memory reference pattern become similar to each other through early context switch, the entire memory reference and power consumption can be reduced. However, the number of times of context switch is increased in the case of the early context switch because context switch is carried out before time allocated to each process is used up. Frequent context switch can be a large overhead to lengthen an execution speed.

To make up for this, the number of cache misses during one tick is counted all the time and locality of currently used data is judged based on the counted number such that early context switch scheduling is not applied to processes using large memory capacity, to prevent frequent context switch.

Figure 7:
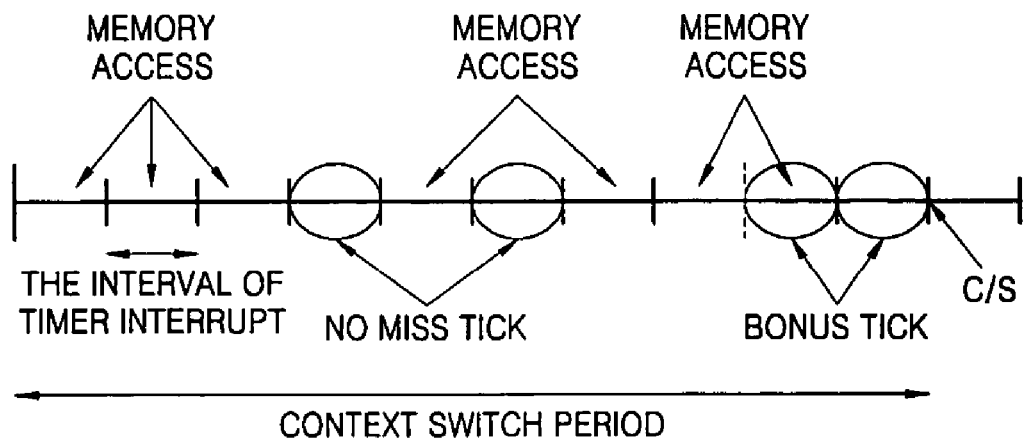
FIG. 7 illustrates lazy context switch scheduling according to the present invention.
Figure 8:
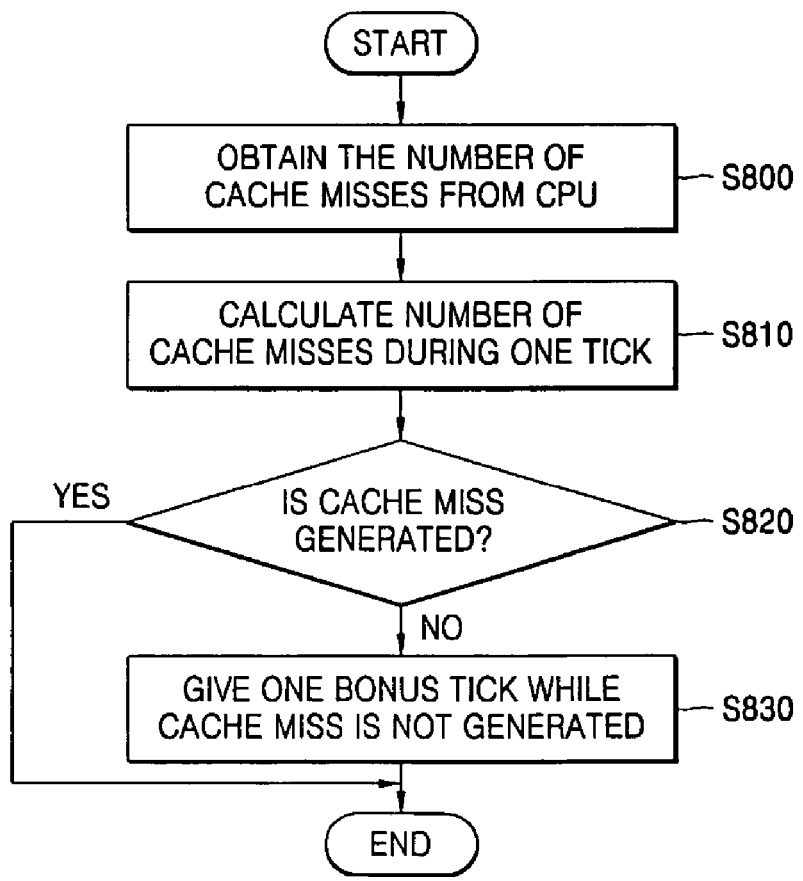
FIG. 8 is a flow chart showing a method of giving a bonus tick by an interrupt handler in the lazy context switch scheduling of FIG. 7.

FIG. 7 illustrates lazy context switch scheduling according to the present invention, and FIG. 8 is a flow chart of a bonus-tick routing used in the lazy context switch scheduling.

In the lazy context switch, one process executes a continuous operation because switch of processes become lazy to make a profit in terms of the use of cache. A large part of the cache is filled with data written by a corresponding process as the time of using the cache is increased, and context switch is not performed to enhance the hit ratio of the cache. This brings about an increase in the execution speed and a reduction in memory power consumption. Accordingly, the entire execution time can be expected to be decreased.

Referring to FIG. 7, a timer interrupt handler is called for every tick after a new process is executed through context switch. Here, the bonus-tick routine shown in FIG. 8 is executed in the interrupt handler. Specifically, the number of cache misses during one tick is counted as if locality of a process is judged and, when the number of cache misses is zero, one tick is added to a given time slice.

The routine is used in order to carry out adaptive scheduling similar to early context switch scheduling. The less the number of ticks during which there is a small number of cache misses, the better the locality of the corresponding process. Accordingly, the number of cache misses is reduced as the execution time of lazy context switch scheduling is increased. A decrease in the number of memory references can reduce memory power and increase the execution speed.

FIG. 8 is a flow chart showing a method of giving the bonus tick by the interrupt handler in the lazy context switch scheduling method of FIG. 7. Referring to FIG. 8, the interrupt handler obtains the number of cache misses from a CPU in the step S800. The interrupt handler calculates the number of cache misses generated during one tick based on the number of cache misses obtained from the CPU in the step S810. When there is no cache miss generated during one tick in the step S820, the interrupt handler give one bonus tick in the step S830.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Conventional low power memory techniques require additional hardware for minute operation or set context switch between processes as a unit and manage memory power consumption. The additional hardware needs additional costs and a change in the system structure. A software control system having context switch between processes as a unit has minuteness lower than a hardware technique, and thus power saving effect is not satisfactory.

The present invention minutely splits one time slice corresponding to the point of time of context switch between processes to divide it into timer interrupt unit time periods in process scheduling to control a memory power state. The time unit is split more minutely so that a low power state of a memory can be maximized through the more accurate operation. This can be easily realized in a software method not a hardware method.

Furthermore, a scheduling method for managing memory power is changed in consideration of a memory access pattern so that power consumption can be reduced more effectively. Moreover, adaptive process scheduling can be performed in response to a memory pattern.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of managing memory power comprising the steps of:
    splitting a period of time allocated to a process into time slices and generating a timer interrupt for every time slice, each time slice having a predetermined time interval;
    checking whether context switch between processes occurs when the timer interrupt is generated;
    activating memory banks of a main memory having a portion thereof allocated to a switched process when the context switch occurs; and
    converting all banks of the main memory, including banks associated with a currently running process, into a low power state after the lapse of a single timer interrupt when the context switch does not occur,
    wherein a cache memory is provided to reduce the occurrence of a read/write request for the main memory.

2. The method of claim 1, further comprising the step of activating a bank of the main memory when the read/write request occurs for the bank in a nap state.

3. A method of managing memory power using early context switch scheduling comprising the steps of:
    splitting a period of time allocated to a process into time slices and generating a timer interrupt for every time slice, each time slice having a predetermined time interval;
    counting with a counter the number of cache misses generated during the time slices when the timer interrupt is generated;
    carrying out context switch when the number of cache misses counted with the counter exceeds a predetermined number, even when the number of cache misses counted by the counter exceeds the predetermined number before the expiration of the period of time allocated to the process; and
    converting all banks of a main memory, including banks associated with a currently running process, into a low power state when the context switch does not occur.

4. The method of claim 3, wherein the step of counting the number of cache misses generated during the time slices when the timer interrupt is generated comprises:
    setting a switching window including a predetermined number of time slices; and
    counting the number of cache misses generated during the time slices in the switching window with the counter.

5. The method of claim 3, wherein the step of carrying out context switch when the counted number of cache misses exceeds a predetermined number comprises activating main memory banks having portion thereof allocated to a process after the context switch.

6. A method of managing memory power using lazy context switch scheduling comprising the steps of:
    splitting a period of time allocated to a process into time slices and generating a timer interrupt for every time slice, each time slicing having a predetermined time interval;
    converting all banks of a main memory, including banks associated with a currently running process, into a low power state when the timer interrupt is generated and checking whether a cache miss is generated during each time slice and counting with a counter the number of cache misses generated during each time slice when a context switch is not generated;
    increasing the number of time slices allocated to the process when the number of cache misses generated for a time slice is equal to zero; and
    performing a context switch between processes only after the lapse of all the time slices, including the increased number of time slices, allocated to the process.

7. The method of claim 6, further comprising the step of activating main memory banks having a portion thereof allocated to a switched process.

8. The method of claim 6, wherein the step of converting all banks of the main memory including the banks associated with the currently running process, into a low power state when the timer interrupt is generated and checking whether a cache miss is generated during the time slices comprises:
    checking whether context switch between processes occurs when the timer interrupt is generated; and
    activating memory banks of the main memory having a portion thereof allocated to a switched process when the context switch occurs.

9. A computer readable storage medium storing a program for executing the method described in one of claims 1 through 8 in a computer.

* * * * *